United States Patent [19]

Ziliotto

[11] Patent Number: 4,486,492
[45] Date of Patent: Dec. 4, 1984

[54] INSULATED CLOTH FOR INDUSTRIAL AND CIVIL COVERING APPLICATIONS

[75] Inventor: Alberto Ziliotto, Cadoneghe, Italy

[73] Assignee: La Plastiveneta S.p.A., Cadoneghe, Italy

[21] Appl. No.: 504,336

[22] Filed: Jun. 14, 1983

[30] Foreign Application Priority Data

Jun. 22, 1982 [IT] Italy ............................ 30736/82[U]

[51] Int. Cl.³ .................. B32B 5/18; B32B 5/24; B32B 5/32
[52] U.S. Cl. .................. 428/252; 428/314.4; 428/315.5; 428/316.6; 428/319.7
[58] Field of Search .................. 428/247, 252, 306.6, 428/308.4, 309.9, 314.4, 314.8, 315.5, 315.7, 315.9, 316.6, 319.3, 319.7

[56] References Cited

U.S. PATENT DOCUMENTS

| 3,360,422 | 12/1967 | Desh | 428/247 |
| 3,733,239 | 5/1973 | George | 428/247 |
| 4,081,579 | 3/1978 | Queen et al. | 428/316.6 |
| 4,110,497 | 8/1978 | Hoel | 428/247 |

FOREIGN PATENT DOCUMENTS 901057 7/1962 United Kingdom ............. 428/247

Primary Examiner—William J. Van Balen
Attorney, Agent, or Firm—Guido Modiano; Albert Josif

[57] ABSTRACT

This invention has for its subject matter an insulated cloth for industrial and civil covering applications, which comprises a high toughness support cloth, one face whereof is coated with an outside coating including a compact plastic composition and the other face includes a first coating of compact polyvinylchloride (PVC) overlaid by a second coating of foamed polyvinylchloride (PVC).

3 Claims, 1 Drawing Figure

U.S. Patent  Dec. 4, 1984  4,486,492
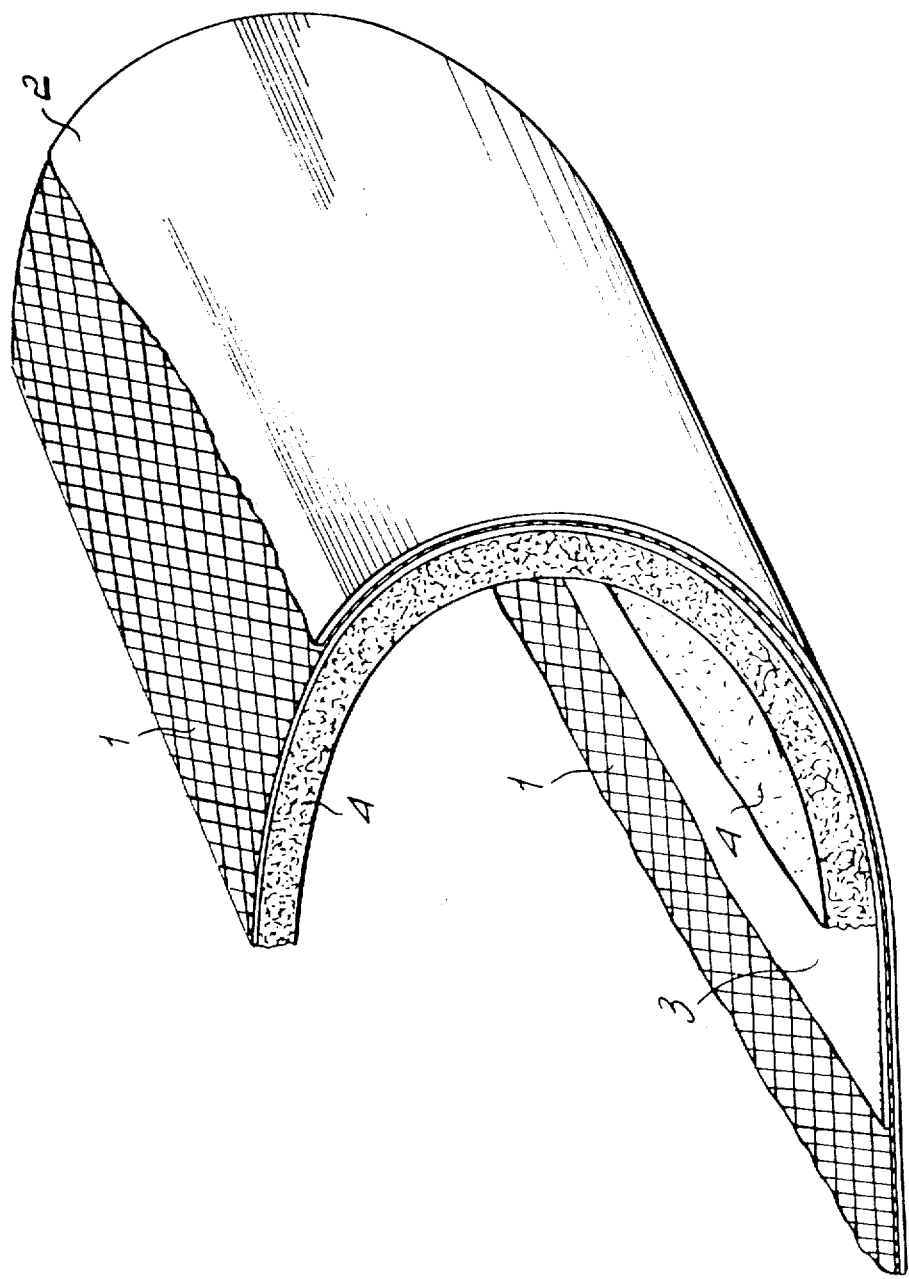

INSULATED CLOTH FOR INDUSTRIAL AND CIVIL COVERING APPLICATIONS

BACKGROUND OF THE INVENTION

This invention relates to an insulated cloth for industrial and civil covering applications.

In the field of large roofed constructions, widespread acceptance are presently enjoying high-toughness cloths coated with plastic materials.

Such is the case with the fabrication of tent structures, tensioned structures, inflatable sheds, and other comparable roofed constructions.

The cloths currently employed for such purposes have several disadvantages.

A first disadvantage stems from said cloths affording, on account of their small thickness, a low coefficient of thermal insulation, so that sheds and premises formed from such materials are highly expensive to keep up as regards their ambient air conditioning.

A second shortcoming to be met with structures formed from such cloths is the considerable sonority of the interior space due to reflection of sound waves from the coated cloth.

A further problem comes from such cloths, because of their impervious nature and, as mentioned, poor thermal insulation properties, becoming the seat of moisture condensation which is liable to fall into the enclosed space when the structure is vibrated.

SUMMARY OF THE INVENTION

It is an object of this invention to provide an insulated cloth which is useful in the fabrication of roofs for large size structures, and has such features as to overcome the deficiencies of currently employed cloths.

A consequent primary object is to provide a high strength cloth having good thermal insulation properties.

Another object is to provide a cloth which also has low sound reflecting properties and is, therefore, suitable for fabricating sound-insulated rooms.

A further object is to provide a cloth which has anticondensation properties.

These and other objects, such as will be more readily apparent hereinafter, are achieved by an insulated cloth for industrial and civil covering applications, characterized in that it comprises a support of a high toughness cloth, one face of said cloth being coated with a compact plastic composition, whereas the other face includes a first coating of compact polyvinylchloride (PVC) overlaid by a second coating of foamed polyvinylchloride (PVC).

BRIEF DESCRIPTION OF THE DRAWING

Further features and advantages of the invention will be more clearly understood from the following description of a preferred embodiment thereof, with reference to the only FIGURE of the accompanying drawing.

DESCRIPTION OF THE PREFERRED EMBODIMENT

Making reference to the cited drawing, the invention comprises a first support layer of cloth 1 of a high toughness polymer such as polyester or polyamide, having a first surface which in use will be the outside of the structure is deposited a coating layer 2 of compact plastisol in one or more passes, which forms an outside coating with an exposed side. The cloth 1 presents further a second surface, opposite to said first surface, which is intended to form the inside of the structure or roof fabricated with that product and, is preferably coated first with a coating which creates a layer 3 of compact polyvinylchloride. The coating layer 3 of compact PVC defines a first contact side facing the second surface of the cloth layer 1 and a second contact side opposite to the first contact side.

Said compact polyvinylchloride 3 is overlaid with foamed polyvinylchloride at said second contact side thereof; to create a partly open layer 4. The coating layer of foamed PVC 4 is formed with half-open surface cells and closed inside cells. In particular the foamed PVC coating layer 4 defines a first contact surface attached to the second contact side of the compact PVC layer 3 and a second contact surface opposite to the first contact surface and forming an inner exposed face.

All of the invention components become, at the end of the process and through conventional techniques, intimately interlocked, and form in practice a unitary flexible structure of considerable thickness.

Owing to the various combined layers, the cloth takes some important characteristics: the use of a support of high toughness polyester or polyamide cloth in combination with the outer coating of compact plastisol and any inside coating of compact polyvinylchloride ensures high strength, toughness, and imperviousness characteristics; the internal coating of a suitable layer of foamed polyvinylchloride brings about additional features.

The first feature is that of a low thermal transfer coefficient, said coefficient being a function of the foam thickness achieved.

Thus, the cloth will exhibit thermal insulation properties, and the roofs formed therefrom will provide enclosed spaces which can be more easily air-conditioned.

The layer of expanded polyvinylchloride foam includes a high number of closed cells, thereby it also behaves as a sound insulator.

The sound-deafening property of the cloth also originates, owing to the provision of the expanded foam, part of the sound vibrations can be absorbed, the vibrations being thus practically cancelled.

A further feature of the cloth comes from that a considerable number of the polyvinylchloride cells in the foamed layer are left open at the surface.

Such open cells are able to absorb a part of the condensed moisture which forms on the inside surface of the roof, thus preventing the formation of sufficiently large droplets to fall down by gravity.

In practice, the cloth is rendered anti-condensation, this expression being understood to mean that it prevents the formation and fall of drops into the interior space.

It should be appreciated from the foregoing description that the combination of multiple layers of different materials with a high mechanical strength cloth achieves all of the invention objects, and in particular provides a cloth material for roofing which is insulated, anti-condensation, and sound-deafening. For some special applications, both faces of the cloth may be provided with the foamed layer described above. In particular a fifth coating layer of foamed material can be provided presenting an at least in part open cellular structure having a first side in contact with the exposed side of the plastisol coating layer 2 and a second side opposite to the first side of the cloth layer 1 and forming itself in this case the outer exposed face of the insulated cloth according to the invention.

Of course, besides the materials just described, other materials with equivalent characteristics may be used. It should be noted that the cloth may be made e.g. of a 1,000 9×9 deniers polyester or a 1,000 12×12 deniers polyester with "PANAMA" type texture, or a 1,500 6×6 deniers polyester. The compact plastic composition may be of polyvinylchloride whereas the foamed PVC is of microcellular type with open or closed cells.

Alternatively the cloth may be made of fibres of "nylon" or of a continuous polyamidic filament produced and sold by the German Company ENKA A.G. of Wuppertal, West Germany.

The PVC resin which gave good results is the one known under the registered Tradmark name "SICRON" or "SOVIC 372 HA" manufactured and sold by the Italian Company MONTEDISON of Milan, Italy. The same products were used for the foamed PVC.

I claim:

1. An insulated cloth for industrial and civil covering applications, comprising:
   a first support layer formed of a high toughness cloth made of a polymeric material selected from polyester and polyamide, said support layer having a first surface and a second surface opposite to said first surface;
   a second coating layer made of a compact plastic composition, adjacent said first support layer at said first surface thereof and forming an outside coating with an exposed side;
   a third coating layer of compact polyvinylchloride (PVC) adjacent said first support layer at said second surface thereof, said third coating layer defining a first contact side facing said second surface of said first support layer and a second contact side opposite to said first contact side; and
   a fourth coating layer of foamed polyvinylcholride (PVC) with half-open surface cells and closed inside cells, said fourth coating layer extending adjacent and bonded to said third coating layer of compact polyvinylchloride at said second contact side thereof, said fourth coating layer defining a first contact surface attached to said contact side of said third coating layer and a second contact surface opposite to said first contact surface and forming an inner exposed face.

2. An insulated cloth for industrial and civil covering applications, comprising:
   a first support layer formed of high toughness cloth made of a polymeric material selected from polyester and polyamide, said support layer having a first surface and a second surface opposite to said first surface;
   a second coating layer made of a compact plastic composition including compact plastisol, said second coating layer adjacent to said first support layer at said first surface thereof and forming an outside coating with an exposed surface;
   a third coating layer of compact polyvinylchloride (PVC) adjacent said first support layer at said second surface thereof, said third coating layer defining a first contact side facing said second surface of said first support layer and a second contact side opposite to said first contact side; and
   a fourth coating layer of foamed polyvinylchloride (PVC) with half-open surface cells and closed inside cells, said fourth coating layer extending adjacent and bonded to said third coating layer of compact polyvinylchloride at said second contact side thereof, said fourth coating layer defining a first contact surface attached to said second contact side of said third coating layer and a second contact surface opposite to said first contact surface and forming an inner exposed face.

3. An insulated cloth for industrial and civil covering applications, comprising:
   a first support layer formed of a high toughness cloth made of a polymeric material selected from polyester and polyamide, said support layer having a first surface and a second surface opposite to said first surface;
   a second coating layer made of a compact plastic composition including compact plastisol adjacent said first support layer at said first surface thereof, said second coating layer defining a first face bonded to said first surface of said first support layer and a second face opposite to said first face;
   a third coating layer of compact polyvinylchloride (PVC) adjacent said first support layer at said second surface thereof, said third coating layer defining a first contact side facing said second surface of said first support layer and a second contact side opposite to said first contact side;
   a fourth coating layer of foamed polyvinylchloride (PVC) with half-open surface cells and closed inside cells, said fourth coating layer extending adjacent and bonded to said third coating layer of compact polyvinylchloride at said second contact side thereof, said fourth coating layer defining a first contact surface attached to said second contact side of said third coating layer and a second contact surface opposite to said first contact surface and forming an inner exposed face; and
   a fifth coating layer of foamed material at least in part of open cellular structure having a first side in contact with and bonded to said first side of said second coating layer and a second side opposite to said first side of said fifth layer and forming outer exponsed face.

* * * * *